United States Patent [19]

Lisec

[11] Patent Number: 4,947,537

[45] Date of Patent: Aug. 14, 1990

[54] PROCESS AND APPARATUS FOR FILLING HOLLOW MOLDINGS

[76] Inventor: Peter Lisec, Bahnhofstrasse 34, A-3363 Amstetten-Hausmening, Austria

[21] Appl. No.: 373,255

[22] Filed: Jun. 29, 1989

[30] Foreign Application Priority Data

Jun. 30, 1988 [AT] Austria ................................ 1706/88

[51] Int. Cl.[5] ........................ B23P 13/02; B23P 23/06

[52] U.S. Cl. ........................................ 29/527.1; 29/331; 29/527.4; 29/897.312; 52/656; 72/306; 72/369

[58] Field of Search ................. 29/527.4, 527.1, 32 T, 29/157 T, DIG. 3, 407; 72/369; 52/656

[56] References Cited

U.S. PATENT DOCUMENTS

| | | | |
|---|---|---|---|
| 3,841,138 | 10/1974 | Zinnbauer | 72/369 |
| 4,261,145 | 4/1981 | Bröcking | 52/656 X |
| 4,462,237 | 7/1984 | Käuferle et al. | 72/324 |
| 4,574,553 | 3/1986 | Lisec | 72/369 X |
| 4,597,279 | 7/1986 | Lisec | 72/306 |
| 4,627,263 | 12/1986 | Bayer et al. | 72/369 X |
| 4,660,271 | 4/1987 | Lenhardt | 29/527.4 |

FOREIGN PATENT DOCUMENTS

| | | |
|---|---|---|
| 365551 | 1/1982 | Austria . |
| 377751 | 4/1985 | Austria . |
| 0121873 | 10/1984 | European Pat. Off. . |
| 2905841 | 8/1980 | Fed. Rep. of Germany . |
| 2907838 | 9/1980 | Fed. Rep. of Germany . |
| 3223881 | 7/1983 | Fed. Rep. of Germany . |
| 3231698 | 3/1984 | Fed. Rep. of Germany . |
| 3312764 | 10/1984 | Fed. Rep. of Germany . |
| 87057964 | 7/1987 | Fed. Rep. of Germany . |
| 2449222 | 9/1980 | France . |
| 254731 | 3/1988 | German Democratic Rep. . |

*Primary Examiner*—Carl E. Hall
*Assistant Examiner*—Carl J. Arbes
*Attorney, Agent, or Firm*—Young & Thompson

[57] ABSTRACT

When filling hollow molds, to be bent into spacer frames, with a hygroscopic material, the filling process is interrupted as soon as the material filled into the hollow molding has reached a location of the hollow molding where the latter is to be bent into a corner. At this location, the wall of the hollow molding which subsequently forms the inside in the spacer frame is made to bulge. Then introduction of hygroscopic material into the hollow molding is continued, interrupted at the next location of a corner, the walls are made to bulge, until four locations of the sidewall in the hollow molding have been provided with a bulge, and the hollow molding is completely filled. Also, a device is described suitable for performing the process. This device comprises a stamp (16) for indenting the hollow molding and an ultrasonic sensor which responds to the filling level of the hygroscopic material in the hollow molding.

9 Claims, 1 Drawing Sheet

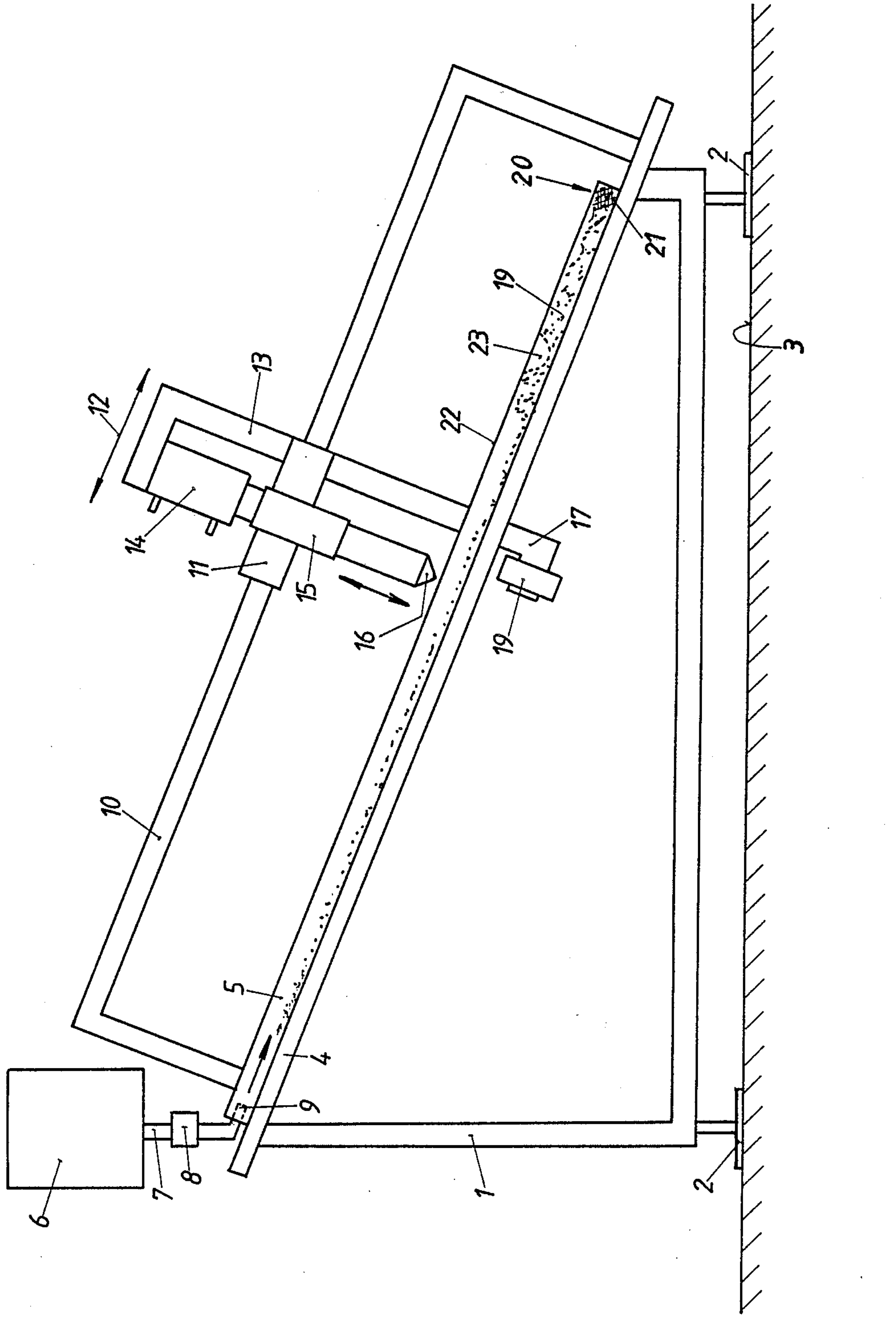
1
2
2
3
4
5
6
7
8
9
10
11
12
13
14
15
16
17
19
19
19
20
21
22
23

PROCESS AND APPARATUS FOR FILLING HOLLOW MOLDINGS

The invention relates to a process for filling hollow moldings, to be bent into spacer frames, with a hygroscopic material wherein the hygroscopic material is introduced into the hollow molding from one end, optionally promoted by a carrier gas stream.

Austrian Pat. No. 365,551 discloses a device for filling hollow moldings with a hygroscopic material. The hollow moldings are sealed, after filling, with plastic foam plugs at their two ends and thereafter composed by plug-in connection into a spacer frame with the use of corner angles.

German Pat. No. 2,907,838 describes as conventional to fill, during the manufacture of spacer frames from a metal strip, the latter with a hygroscopic material before the hollow molding is closed, i.e. while it still has a substantially U-shaped cross section. This mode of operation has the drawback that hygroscopic material crumbles in the zone of the bending sites (corners of the spacer frame); as a consequence, the thus-formed dust escapes through the perforations on the inside wall of the hollow molding or through the slot provided at that location into the interior of the finished insulating glass pane. In case more abrupt corners are to be provided by bending, the filled-in hygroscopic material presents an obstacle and there is the danger that the hollow molding, especially its outer wall, will burst during the bending step. Also the flanged seam on the inside of the hollow molding can burst open during the bending process.

Therefore, it has been suggested (U.S. Pat. Nos. 4,356,614 and 4,462,237) to insert small blocks of plastic foam material, when filling hygroscopic material into metal strips shaped into a U-form which are then closed into a hollow spacer molding, in the zone of the corners that are to be produced subsequently, so that no hygroscopic material can be present in such zone. On account of the problems when bending filled hollow spacer moldings, spacer frames that have been manufactured according to the process of U.S. Pat. Nos. 4,574,553 and 4,597,279 for example, from empty hollow moldings are subsequently filled with hygroscopic material (compare Austrian Pat. No. 365,551, German Pat. No. 2,907,838).

Another proposal (DOS 3,312,764) consists, when bending hollow spacer moldings filled with a hygroscopic material, of constantly rolling the outside of the molding during the bending step by means of a pressure roll in order to displace the hygroscopic material from the corner region.

It is known from East German Pat. No. 254,731 to enhance the filling of hollow moldings with a hygroscopic material by means of compressed air.

The invention provides a process of the type discussed hereinabove making it possible to fill hollow moldings with a hygroscopic material in such a way that they can be bent without any problems into spacer frames having sharp corners without there being the danger that the hollow molding, during the bending processes, bursts or is deformed in the zone of the corners or that the hygroscopic material is comminuted into dust during the bending step.

This object has been attained according to this invention by interrupting the filling procedure as soon as the hygroscopic material filled into the hollow molding reaches a location of the hollow molding where a corner is to be bent, by making a bulge in the wall of the hollow molding which subsequently constitutes the inside in the spacer frame, and by continuing the introduction of hygroscopic material into the hollow molding after making the bulge in the wall of the hollow molding, and so forth, until four locations of the sidewall in the hollow molding have been provided with a bulge.

The mode of operation according to this invention ensures that there is practically no hygroscopic material present in the zone of the locations of the spacer frame hollow molding which are bent for forming the corners of a spacer frame, so that the bending procedure is not impeded. Additionally, the bulging of the wall of the hollow molding subsequently forming the inside surface of the spacer frame facilitates the bending step quite considerably, as known per se from U.S. Pat. Nos. 4,574,553 and 4,597,279.

The invention furthermore concerns a device for filling hollow moldings, intended to be spacer frames or parts of such spacer frames for insulating glass panes, with a hygroscopic material, with a means for filling the hygroscopic material into the hollow molding, with a support for the hollow molding, and optionally with an arrangement for producing a carrier gas stream enhancing the filling process, for example a blower.

According to the invention, this device is characterized in that an embossing stamp is provided which, for making a bulge in the wall of the hollow molding forming the inside surface of a spacer frame, can be advanced toward the hollow molding lying on the support and, after executing a working stroke, can be retracted again, and including a sensor means associated with the embossing stamp, this sensor means transmitting a control signal as soon as the filling level of hygroscopic material in the hollow molding has reached the sensor means; that the embossing stamp and the sensor means are displaceable along the support for the hollow molding, wherein the at least one drive mechanism for the filling head and the embossing stamp can be arrested as soon as the embossing stamp has arrived at a location of the hollow molding where a corner will be formed during the subsequent bending of the hollow molding into the spacer frame.

Additional details and features of the process according to this invention and of the device provided in connection therewith can be seen from the following description of the embodiment schematically illustrated in the drawing in a lateral view.

The device shown in the drawing comprises a frame 1 supported on a floor 3 by way of feet 2. The frame 1 has a support 4 for a spacer frame hollow molding 5 to be filled (the hollow molding 5 is illustrated with exaggerated thickness in order to improve the clarity of the illustration). At the upper end of the support 4, of an obliquely descending structure in the drawing, a storage tank 6 is arranged for hygroscopic material (molecular sieve), a conduit 7 emanating therefrom which can be closed by a shutoff element 8. The free end 9 of the conduit 7 projects into the interior of the hollow molding 5 to be filled.

Furthermore, at least one guide rail 10 is attached to the machine frame 1 and is arranged in parallel to the support 4 above the latter. A slide 11 can be moved along the guide rail 10 in the direction of double arrow 12 in parallel to the support 4 by a drive mechanism, not shown, which latter can be designed as a drive means with an endless toothed belt, an endless chain, a rack-and-pinion gear mechanism, or a spindle drive means. A pressure medium motor 14 is provided on a yoke 13 connected with the slide 11, the piston of this motor passing through a slide guide member 15 and being designed as an embossing stamp 16 at its free end. An embodiment is likewise possible wherein embossing stamps can be attached to the piston rod of the pressure medium motor 14 in an exchangeable manner to be able to adapt the device to various molding configurations and sizes.

The yoke 13 carries a sensor means 18 on an arm 17 extending underneath the support 4; this sensor means transmits a control signal as soon as the filling level of hygroscopic material 19 in the hollow molding 5 reaches the sensor means 18:

The aforedescribed device operates as follows:

A hollow molding 5 is placed on the support 4 after it has been previously sealed at its lower end 20 by a sealing plug 21, e.g. of synthetic resin foam. The hollow molding 5, having a length corresponding to the circumference of the spacer frame to be produced therefrom, is retained on the support 4 by a holding means, not shown in detail.

After the filling step has begun, or even before its beginning, the embossing stamp 16 is oriented with respect to the hollow molding 5 so that it is located at a point where subsequently a corner will be bent in the hollow molding 5 after its filling with hygroscopic material 19 is finished. For bending the hollow molding 5 into a spacer frame, the apparatus can be employed, for example, that is known from U.S. Pat. Nos. 4,574,553 and 4,597,279 or the device known from German Utility Pat. No. 8,705,796.4.

As soon as the filling level of the hygroscopic material 19 in the hollow molding 5 has reached the sensor means 18, operating, for example, by ultrasonic principle, the sensor means transmits a control signal which, on the one hand, is evaluated for interrupting the filling step (the shutoff element 8 is closed) and, on the other hand, activates the pressure medium motor 14 whereupon the embossing stamp 16 advances and produces a trough-like depression 23 in the wall 22 of the hollow molding (this being the wall which will subsequently constitute the inner surface of the spacer frame) by imparting an inward bulge to the wall 22. The embossing stamp 16 is then retracted and the filling process is continued. During the continued filling step, the embossing stamp 16 and the sensor means 18 are moved further, by the drive mechanism, not shown, to the next point of the molding 5 where a corner is to be produced by bending (this being the position shown in the drawing). This operation is repeated until four trough-like indentations 23 have been embossed in the hollow molding 5, and the hollow molding has been filled with hygroscopic material up to its end connected to the filling device.

It is also to be noted that the support 4 for the hollow molding 5 need not absolutely be oriented in an inclined fashion. The hollow molding 5 can also be arranged horizontally in the device, especially if the filling of the hollow molding 5 with hygroscopic material is enhanced by a carrier gas stream.

What is claimed is:

1. Process for filling hollow moldings, to be bent into spacer frames, with hygroscopic material wherein the hygroscopic material is introduced from one end into the hollow molding, comprising interrupting the filling step as soon as the hygroscopic material filled into the hollow molding has reached a location of the hollow molding wherein a corner is to be formed; making a bulge in the wall of the hollow molding subsequently forming the inside in the spacer frame; and resuming the introduction of hygroscopic material into the hollow molding after making the bulge in the wall of the hollow molding, until four locations of the sidewall in the hollow molding have been provided with a bulge, and the hollow molding has been completely filled, each said bulge having such an extent that the penetration of hygroscopic material at the thus-constricted internal cross section of the hollow molding is at least made difficult.

2. Device for filling hollow moldings (5), intended as spacer frames or parts of such spacer frames for insulating glass panes, with a hygroscopic material, comprising a unit (6 through 9) for filling the hygroscopic material (19) into a hollow molding (5), a support (4) for the hollow molding (5) oriented horizontally or obliquely descending from the filling unit (6 through 9), an embossing stamp (16) for creating a bulge in the wall (22) of the hollow molding (5) forming the inner surface of a spacer frame produced from the hollow molding (5), means for advancing the stamp (16) toward the hollow molding (5) lying on the support (4) and for retracting the stamp after the execution of a working stroke, and sensor means (18) associated with the embossing stamp (16), this sensor means transmitting a control signal as soon as the filling level of hygroscopic material (19) in the hollow molding (5) has reached the sensor means (18); the embossing stamp (16) and the sensor means (18) being displaceable along the support (4) for the hollow molding and being adapted to be arrested as soon as the embossing stamp (16) has arrived at a point of the hollow molding (5) where a corner is formed during the bending of the hollow molding (5) into a spacer frame.

3. Device according to claim 2, wherein the embossing stamp (16) can be advanced and pushed back perpendicularly to the longitudinal extension of the hollow molding (5), i.e. perpendicularly to the support (4).

4. Device according to claim 2, wherein the sensor means (18) and the embossing stamp (16) are arranged on mutually opposite sides of the support (4).

5. Device according to claim 2, wherein the sensor means (18) is arranged with respect to the axis of the embossing stamp (16) offset toward the end of the hollow molding (5) facing away from the filling unit (6 through 9).

6. Device according to claim 2, wherein the embossing stamp (16) and the sensor means (18) are arranged on a joint slide (11) displaceable by a drive mechanism along the support (4) for the hollow molding (5) on a guide means (10) extending in parallel to the support (4).

7. Device according to claim 2, wherein the embossing stamp (16) can be moved forwards and backwards by a pressure medium motor (14).

8. Device according to claim 2, wherein the embossing stamp (16) is exchangeable.

9. Device according to claim 2, wherein the sensor means (18) comprises a sensor which responds to hygroscopic material (19) filled into the hollow molding.

* * * * *